United States Patent
Ehlers et al.

(10) Patent No.: US 10,246,194 B2
(45) Date of Patent: Apr. 2, 2019

(54) FLIGHT ATTENDANT SEAT ARRANGEMENT

(71) Applicant: Airbus Operations GmbH, Hamburg (DE)

(72) Inventors: Bernd Ehlers, Hamburg (DE); Wei-Chung Tuan, Hamburg (DE); Mark Herzog, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 363 days.

(21) Appl. No.: 14/719,555

(22) Filed: May 22, 2015

(65) Prior Publication Data

US 2015/0251762 A1 Sep. 10, 2015

Related U.S. Application Data

(63) Continuation of application No. PCT/EP2013/074661, filed on Nov. 26, 2013.

(Continued)

(30) Foreign Application Priority Data

Nov. 26, 2012 (DE) .................. 10 2012 023 045

(51) Int. Cl.
*B64D 11/06* (2006.01)
*B64D 11/00* (2006.01)

(52) U.S. Cl.
CPC ...... *B64D 11/0691* (2014.12); *B64D 11/0015* (2013.01); *B64D 11/06* (2013.01);
(Continued)

(58) Field of Classification Search
CPC ............ B64D 11/0691; B64D 11/0611; B64D 11/064
(Continued)

(56) References Cited

U.S. PATENT DOCUMENTS 3,594,037 A * 7/1971 Sherman ................ A47C 1/036
297/14
4,580,832 A * 4/1986 Maruyama ............... A47C 9/06
297/14
(Continued)

FOREIGN PATENT DOCUMENTS

DE 102008009938 9/2009
DE 102010054942 6/2012
(Continued)

OTHER PUBLICATIONS

U.S. Appl. No. 61/598,762 (corresponding to U.S. Pub. No. 20130206906 to Burrows et al.).*
(Continued)

*Primary Examiner* — Tien Q Dinh
*Assistant Examiner* — Alexander V. Giczy
(74) *Attorney, Agent, or Firm* — Greer, Burns & Crain, Ltd.

(57) ABSTRACT

A flight attendant seat arrangement comprises a monument which is suitable for installation in an aircraft cabin, a first receiving recess being constructed in a wall of said monument. A flight attendant seat has a backrest element and also a seat element. The backrest element and seat element are at least partially received within the first receiving recess constructed in the wall of the monument. The wall of the monument is of a double-walled design comprising a support wall which forms the rear wall of the first receiving recess and extends from said first receiving recess as far as an end of the monument on a floor side, and an outer wall which is oriented substantially parallel to the support wall, and wherein the backrest element and the seat element of the flight attendant seat are fastened to the support wall.

10 Claims, 3 Drawing Sheets

Related U.S. Application Data

(60) Provisional application No. 61/729,641, filed on Nov. 26, 2012.

(52) U.S. Cl.
CPC .......... B64D 11/062 (2014.12); B64D 11/064 (2014.12); B64D 11/0629 (2014.12); *Y02T 50/46* (2013.01)

(58) Field of Classification Search
USPC .......................................................... 297/14
See application file for complete search history.

(56) References Cited

U.S. PATENT DOCUMENTS

| | | | | |
|---|---|---|---|---|
| 4,774,514 | A * | 9/1988 | Hildebrandt | A63F 13/12 340/3.71 |
| 4,799,632 | A * | 1/1989 | Baymak | B64D 11/0691 244/122 R |
| 4,832,404 | A * | 5/1989 | Baymak | B64D 11/0691 280/808 |
| 4,993,666 | A * | 2/1991 | Baymak | B09B 1/00 244/122 R |
| 5,533,774 | A * | 7/1996 | Cavanaugh | B60N 2/3095 296/66 |
| 5,808,661 | A * | 9/1998 | Infiesto | B64D 11/00155 348/14.01 |
| 6,378,939 | B1 * | 4/2002 | Knoll | B60N 2/4242 188/374 |
| 7,195,302 | B2 * | 3/2007 | Jovicevic | B60N 2/2809 296/65.01 |
| 8,096,502 | B2 | 1/2012 | Bock et al. | |
| 8,757,711 | B2 * | 6/2014 | Bertocchi | B60N 2/4802 296/65.09 |
| 9,084,489 | B2 * | 7/2015 | Gosling | |
| 2002/0000490 | A1 * | 1/2002 | Angerami | B60N 2/24 244/118.5 |
| 2003/0085601 | A1 * | 5/2003 | Hudswell | B60N 2/3047 297/312 |
| 2004/0027256 | A1 * | 2/2004 | Lane | B64D 45/0015 340/945 |
| 2005/0082430 | A1 * | 4/2005 | Young | B64C 1/066 244/119 |
| 2005/0114991 | A1 * | 6/2005 | Steigerwald | E03D 5/06 4/300 |
| 2006/0202085 | A1 * | 9/2006 | Schotte | B64D 11/00 244/119 |
| 2007/0228216 | A1 * | 10/2007 | Wenstrom | B64D 11/04 244/118.5 |
| 2007/0273192 | A1 * | 11/2007 | Van Druff | B60N 2/4242 297/339 |
| 2009/0206200 | A1 | 8/2009 | Bolder et al. | |
| 2009/0242700 | A1 * | 10/2009 | Raymond | B60N 2/1695 244/118.6 |
| 2011/0114788 | A1 * | 5/2011 | Mosler | B64D 11/0023 244/118.5 |
| 2011/0273849 | A1 * | 11/2011 | Jaeger | B64D 11/04 361/725 |
| 2013/0126671 | A1 * | 5/2013 | Guering | B64D 11/06 244/118.6 |
| 2013/0206906 | A1 * | 8/2013 | Burrows | B64D 11/0691 244/118.5 |
| 2013/0313365 | A1 | 11/2013 | Ehlers et al. | |
| 2014/0084640 | A1 * | 3/2014 | Walker | A47C 9/06 297/14 |

FOREIGN PATENT DOCUMENTS

| | | | | |
|---|---|---|---|---|
| EP | 2484589 | | 8/2012 | |
| FR | 2120503 | A5 * | 8/1972 | ............... B60N 2/24 |
| FR | 2962714 | | 1/2012 | |
| WO | 8701355 | A1 | 3/1987 | |
| WO | 8801589 | | 3/1988 | |
| WO | 2012080135 | | 6/2012 | |

OTHER PUBLICATIONS

Airliners.Net, "What is a Jump Seat?", circa 2003; http://www.airliners.net/forum/viewtopic.php?t=215329; accessed Jul. 17, 2017.*
FR2962714—English Machine Translation.*
Tim Clark, "Ryanair announces plans to launch 'vertical seating' for £4", Daily Mail, Jul. 2, 2010; https://www.dailymail.co.uk/travel/article-1291131/Ryanair-launch-vertical-seating-Standing-room-tickets-4.html; accessed Nov. 26, 2018 (Year: 2010).*
International Search Report, dated Jan. 23, 2014.
European Office Action for corresponding European Patent Application No. 13795498.8.

* cited by examiner

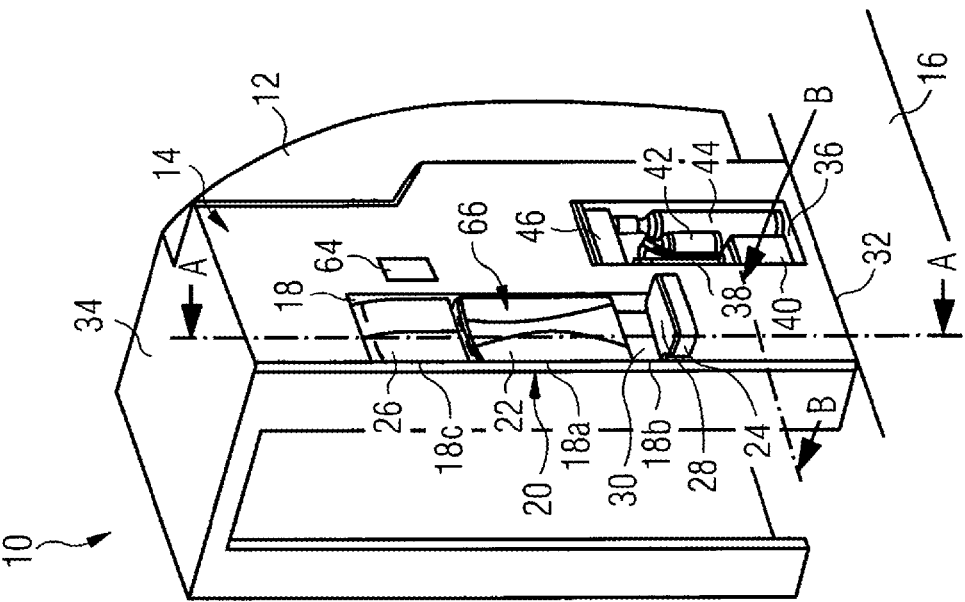
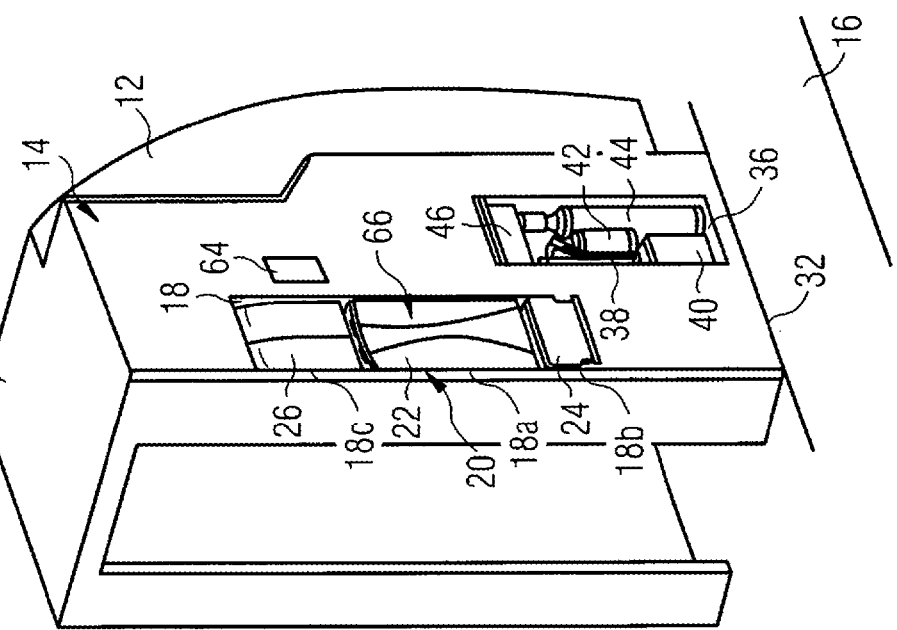

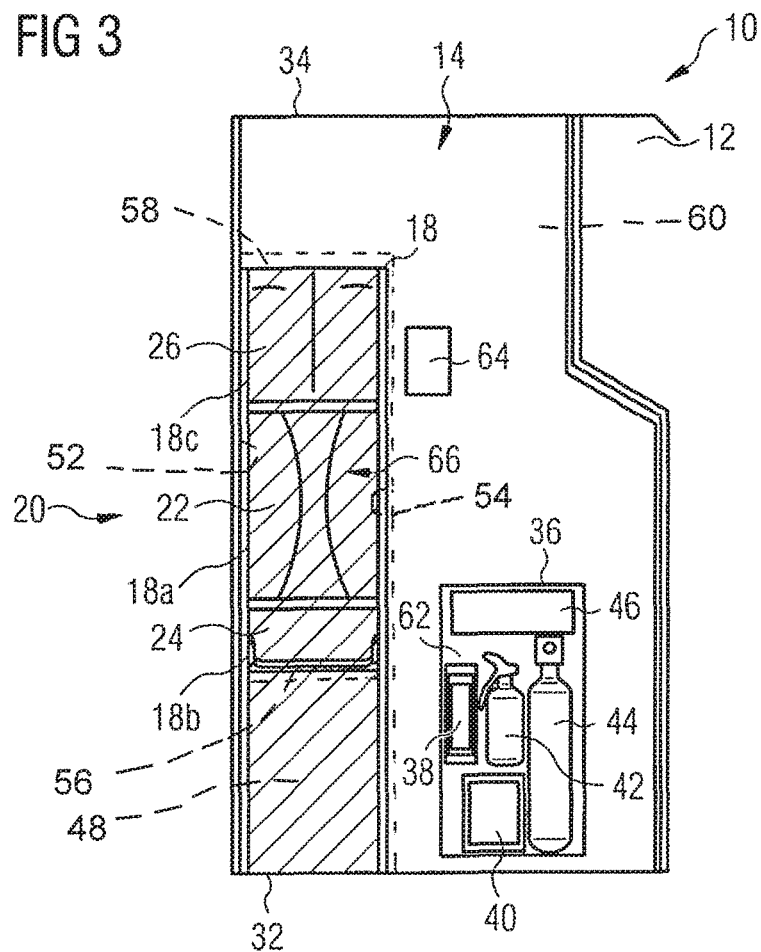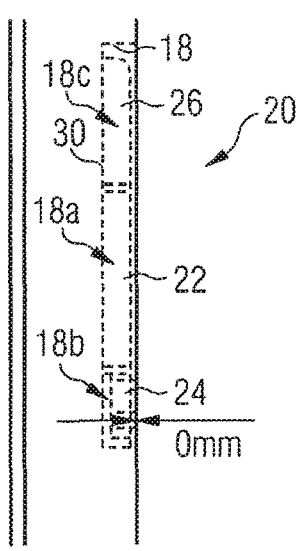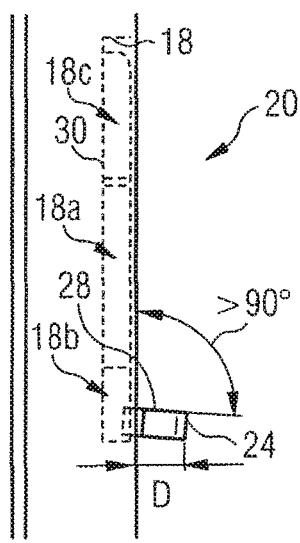

FLIGHT ATTENDANT SEAT ARRANGEMENT

CROSS-REFERENCES TO RELATED APPLICATIONS

This application is a continuation of International Application PCT/EP2013/074661 filed Nov. 26, 2013, designating the United States and published on May 30, 2014 as WO 2014/080025. This application also claims the benefit of the U.S. Provisional Application No. 61/729,641, filed on Nov. 26, 2012, and of the German patent application No. 10 2012 023 045.1 filed on Nov. 26, 2012. The entire disclosures of the above are incorporated herein by way of reference.

BACKGROUND OF THE INVENTION

The invention relates to a flight attendant seat arrangement which is intended for installation in an aircraft cabin.

The passenger cabin of a modern commercial aircraft is usually equipped with flight attendant seats on which flight attendants can sit down during take-off and landing of the aircraft. The flight attendant seats are usually arranged in the door areas of the aircraft cabin. From DE 10 2008 009 938 A1 or US 2009/0206200 A1, for example, a flight attendant seat is known, the backrest of which borders on a side wall of a monument, for example a toilet module, and which has a folding seat element that can be tilted relative to the backrest.

DE 10 2010 054 942 A1 or WO 2012/080 135 A1 discloses a flight attendant seat which likewise borders on a side wall of a monument and is constructed in the form of a stand-up seat.

SUMMARY OF THE INVENTION

An object at which the invention is aimed is to indicate a flight attendant seat arrangement which is designed in such a way that it permits optimum utilization of the space available within the passenger cabin of an aircraft.

The flight attendant seat arrangement comprises a monument which is suitable for installation in an aircraft cabin. The monument in question may be a toilet module, a galley, a partition or any other desired monument which is intended for fitting-out an aircraft cabin. A first receiving recess is constructed in a wall of the monument. Preferably, the first receiving recess is a fixed recess and in particular may be formed integral with the wall of the monument. When the monument is installed in the aircraft cabin, the wall of the monument in which the first receiving recess is constructed preferably faces towards a door aisle of said aircraft cabin that connects a main aisle with a door. In particular, the wall of said monument in which the first receiving recess is constructed may form a lateral boundary of the door aisle when the monument is installed in the aircraft cabin. Furthermore, the wall of the monument in which the first receiving recess is constructed is preferably oriented counter to the direction of flight when the flight attendant seat arrangement is installed in an aircraft cabin.

The flight attendant seat arrangement also comprises a flight attendant seat which has a backrest element and a seat element. The backrest element is fixedly attached to a rear wall of the first receiving recess such that the backrest element extends substantially parallel to the rear wall of the first receiving recess and a portion of the wall of said monument which borders the first receiving recess. Hence, the backrest element is fixed to the wall of the monument in a particularly secure manner. Furthermore, the flight attendant seat is easy to install and easy to service. The backrest element and the seat element are at least partially received within the first receiving recess constructed in the wall of the monument. The flight attendant seat arrangement thus permits optimal utilization of the space available in the passenger cabin of the aircraft. In particular, the space required by the flight attendant seat in an area of the aircraft cabin that borders on the wall of the monument is limited. Compared to a conventional flight attendant seat, the flight attendant seat belonging to the flight attendant seat arrangement therefore has a very much less disruptive effect during the periods in which said seat is not in use, than a conventional flight attendant seat which is known from the prior art.

In a preferred embodiment of the flight attendant seat arrangement, the seat element is pivotable, relative to the backrest element, between an inoperative position in which a seating surface of said seat element faces towards the rear wall of the first receiving recess, and a usable position in which the seating surface of said seat element forms an angle of between 80 and 100° with said rear wall of the first receiving recess. When the seat element of the flight attendant seat is located in its inoperative position, said flight attendant seat has a particularly low space requirement. The seating surface of the seat element preferably rests against the rear wall of the first receiving recess when said seat element is in its inoperative position. Said first receiving recess then preferably has a first section in which the backrest element is at least partially received, and also a second section which serves to receive the seat element in its inoperative position. The seat element may be pivotably attached to the to the rear wall of the first receiving recess. It is, however, also conceivable to attach the seat element to a wall of the first receiving device which defines a boundary of the first receiving recess on a floor side.

The backrest element is preferably completely received within the first section of the first receiving recess constructed in the wall of the monument. In other words, the depth of said backrest element is preferably smaller than, or the same as, the depth of the first section of the first receiving recess constructed in the wall of the monument.

The seat element may also be completely received within the second section of the first receiving recess constructed in the wall of the monument, at least when said seat element is located in its inoperative position. In other words, the depth of the seat element is preferably smaller than, or the same as, the depth of the second section of the first receiving recess constructed in the wall of the monument. If both the backrest element and the seat element, in their inoperative position, are completely received within the first receiving recess constructed in the wall of the monument, the flight attendant seat does not constitute any disruptive obstruction when it is in the unused condition in an area of the aircraft cabin which is adjacent to the wall of the monument. On the contrary, this area of the aircraft cabin can be used in advantageous manner, for example for maneuvering trolleys or for other activities for which the cabin staff are responsible on board an aircraft. Particularly if the wall of the monument in which the first receiving recess is constructed forms a lateral boundary of the door aisle when the monument is installed in the aircraft cabin, it is at the same time guaranteed that the flight attendant seat does not protrude, when in the unused condition, into an area of the aircraft cabin that serves as an evacuation route in an emergency.

In a particularly preferred embodiment of the flight attendant seat arrangement, the flight attendant seat is constructed as a stand-up seat. A flight attendant seat which is constructed as a stand-up seat differs from a conventional flight attendant seat on which a person can sit down in a sitting position, by a suitable design and arrangement of the backrest element and also of the seat element. Since a person assumes a standing position on a stand-up seat, the backrest element of a stand-up seat is preferably positioned in such a way that it is located at the height of a standing person's back. Likewise, the seat element is preferably positioned in such a way that it is able to support a standing person's buttocks. If the flight attendant seat arrangement according to the invention is equipped with a flight attendant seat constructed as a stand-up seat, the receiving recess constructed in the wall of the monument is accordingly positioned at a suitable height.

Furthermore, the seat element of a flight attendant seat which is constructed as a stand-up seat has a substantially smaller seating surface than a seat element of a conventional flight attendant seat on which a person is able to sit down in a sitting position. Consequently, a flight attendant seat which is constructed as a stand-up seat has a lower space requirement, particularly in its usable position. In addition, the seat element of smaller size which is optimized for a stand-up seat can be received without any difficulty in the second section of the first receiving recess when said seat element is in its inoperative position. A further advantage of a flight attendant seat which is constructed as a stand-up seat consists in the fact that a flight attendant is able to get into an evacuation position more quickly in an emergency, even when he is located on the flight attendant seat, because of his standing posture. In addition, a flight attendant who is located on a flight attendant seat which is constructed as a stand-up seat has a better overview of the cabin than a flight attendant who is located in a sitting position on a conventional flight attendant seat. The loss of comfort for a flight attendant who is using a flight attendant seat constructed as a stand-up seat instead of a conventional flight attendant seat on which he is able to sit down in a sitting position is relatively slight, since the times for which the flight attendant seat is in use during a flight are confined to the takeoff phase and also the landing phase and are consequently comparatively short.

If the flight attendant seat is constructed as a stand-up seat and the seat element can be tilted, relative to the backrest element, between an inoperative position and a usable position, the angle which the seating surface of the seat element forms with the rear wall of the first receiving recess when said seat element is in its usable position is preferably greater than 90°. Such an orientation of the seat element increases the comfort for a person located on the flight attendant seat which is constructed as a stand-up seat.

The flight attendant seat arrangement may also comprise a headrest which is at least partially, and preferably completely, received within a third section of the first receiving recess constructed in the wall of the monument. If the headrest is completely received within the third section of the first receiving recess constructed in the wall of the monument, the depth of said headrest is consequently smaller than, or the same as, the depth of said third section of the first receiving recess. The third section of the first receiving recess, which at least partially receives the headrest, preferably borders on the first section of the first receiving recess which at least partially receives the backrest element.

In an embodiment of the flight attendant seat arrangement, the wall of the monument preferably comprises a support wall which forms the rear wall of the first receiving recess and which, in addition, extends from said first receiving recess as far as an end of the monument on a floor side. Furthermore, the wall of the monument preferably comprises an outer wall which is oriented substantially parallel to the support wall. In other words, the wall of the monument is preferably of double-walled design, the support wall merely extending within an area of the wall of the monument which is used for fastening the flight attendant seat and also an area of said wall which is necessary, in an emergency, for dissipating forces acting upon said flight attendant seat. On the other hand, the outer wall may extend over the entire area of the wall of the monument, in which case, however, at least the first receiving recess is left cut out.

The backrest element and the seat element of the flight attendant seat are preferably fastened to the support wall. If the flight attendant seat belonging to the flight attendant seat arrangement has a headrest as well, said headrest is preferably also fastened to the support wall. The fastening of the components of the flight attendant seat to the support wall preferably takes place in the area of the first receiving recess, i.e., in the area of that rear wall of said first receiving recess which is formed by the first support wall. Said support wall is preferably designed and dimensioned in such a way that it is capable of dissipating a predetermined maximum force which may be introduced into the flight attendant seat in the course of the normal operation of an aircraft during flight. The maximum force which the support wall must be able to dissipate is predetermined by appropriate licensing regulations. The flight attendant seat can then be used as additional seating during flight.

However, the support wall to which the backrest element and seat element of the flight attendant seat may be fastened may also be designed and dimensioned in such a way that it is capable of dissipating a predetermined maximum force which may be introduced into said flight attendant seat in the event of a crash. In this case, the maximum force in question is a calculated maximum force that acts upon the flight attendant seat in an emergency. For example, the force which acts upon the flight attendant seat when said seat is exposed to an acceleration of 9 G or 16 G may be assumed as the predetermined maximum force. The flight attendant seat can then be used, even during take-off and during landing.

By configuring the support wall in such a way that it permits the dissipation of all the forces acting upon the flight attendant seat when said seat is in use, it is possible to dispense with an additional support framework for attaching the flight attendant seat to the monument or to a floor of the aircraft cabin. On the contrary, optimal dissipation of force is ensured merely by suitable attachment of the support wall, which extends as far as an end of the monument on a floor side, to the floor of the passenger cabin of the aircraft. Consequently, the flight attendant seat belonging to the flight attendant seat arrangement can be of markedly more lightweight design than a conventional flight attendant seat having a suitable framework for the force-dissipating attachment of said seat within the aircraft cabin. Optimized introduction of force into the support wall is achieved if the wall of the monument in which the first receiving recess for at least partially receiving the components of the flight attendant seat is constructed, and consequently the support wall, are oriented counter to the direction of flight when the flight attendant seat arrangement is installed in an aircraft cabin.

In addition to the support wall and the outer wall, the wall of the monument may also comprise a first side wall which extends substantially perpendicularly to the support wall and the outer wall, between said support wall and said outer wall, and defines a first lateral boundary of the first receiving recess. There may also be provided a second side wall which extends substantially perpendicularly to the support wall and the outer wall and also substantially parallel to the first side wall, between said support wall and said outer wall, and defines a second lateral boundary of the first receiving recess.

The wall of the monument may also comprise a first connecting wall which extends substantially perpendicularly to the support wall, the outer wall, the first side wall and the second side wall, between said support wall and said outer wall, and defines a boundary of the first receiving recess on a floor side. There may also be a second connecting wall which extends substantially perpendicularly to the support wall, the outer wall, the first side wall and the second side wall and substantially parallel to the first connecting wall, between said support wall and said outer wall, and defines a boundary of the first receiving recess on a ceiling side. In such a configuration of the wall of the monument, the first receiving recess is formed by the first and second side walls, the first and second connecting walls and also that rear wall of the first receiving recess which is formed by a section of the support wall.

The wall of the monument may also comprise an inner wall which extends in a manner coplanar with the support wall and substantially parallel to the outer wall. In particular, the inner wall may extend, starting from the second connecting wall, in the direction of a ceiling of the monument as far as said ceiling and, starting from the second side wall, in a direction that faces away from the first receiving recess, from an end of the monument on a floor side as far as the ceiling of said monument. The inner wall preferably has a lower thickness and lower stability than the support wall, and may consequently be of markedly more lightweight design than said support wall. The inner wall preferably extends across those regions of the area of the wall of the monument which do not have to be used for fastening the flight attendant seat and for dissipating forces that act upon said seat in an emergency. The inner wall thus permits a reduction in the overall weight of the flight attendant seat arrangement without the stability of those components of said arrangement which serve for fastening the flight attendant seat and also for dissipating forces acting upon said seat being impaired.

Within the wall of the monument, there may also be constructed a second receiving recess which is dimensioned in such a way that it is suitable for receiving items of emergency equipment. Said items of emergency equipment may be, for example, a flashlight, a first aid pack, a fire-extinguisher and/or an oxygen bottle for the crew. Said second receiving recess may also be suitable for receiving items of equipment for demonstration purposes, for example an oxygen mask or a seat belt. A rear wall of the second receiving recess may be formed by a section of the inner wall, since no force-dissipating functions have to be fulfilled in the area of the second receiving recess.

The flight attendant seat arrangement preferably also comprises a communication system which is arranged in such a way that it is accessible to a person positioned on the flight attendant seat. Said communication system may be arranged, for example, in a third receiving recess which is constructed in the wall of the monument in a manner adjacent to the first receiving recess. As an alternative to this, it is also conceivably possible to integrate the communication system into the flight attendant seat or to attach said system to the outer wall of the monument. Cables which are intended for connecting the communication system to a line network of an aircraft are preferably integrated into the monument. For example, the said cables may be routed within the wall of the monument, particularly within a cavity, between the inner wall and the outer wall of said monument.

The flight attendant seat arrangement preferably also comprises a belt arrangement. The belt arrangement in question may be a four-point belt arrangement which is preferably fastened to the support wall.

BRIEF DESCRIPTION OF THE DRAWINGS

A preferred form of embodiment of the invention will now be explained in greater detail with the aid of the appended diagrammatic drawings, in which FIG. 1 shows a three-dimensional view of a flight attendant seat arrangement, wherein a seat element belonging to a flight attendant seat is located in an inoperative position;

FIG. 2 shows a flight attendant seat arrangement according to FIG. 1, wherein the seat element of the flight attendant seat is located in a usable position;

FIG. 3 shows a front view of the flight attendant seat arrangement according to FIG. 1;

FIG. 4 shows a side view of the flight attendant seat arrangement according to FIG. 1;

FIG. 5 shows a side view of the flight attendant seat arrangement according to FIG. 2;

DETAILED DESCRIPTION OF THE PREFERRED EMBODIMENTS

Figure 6:
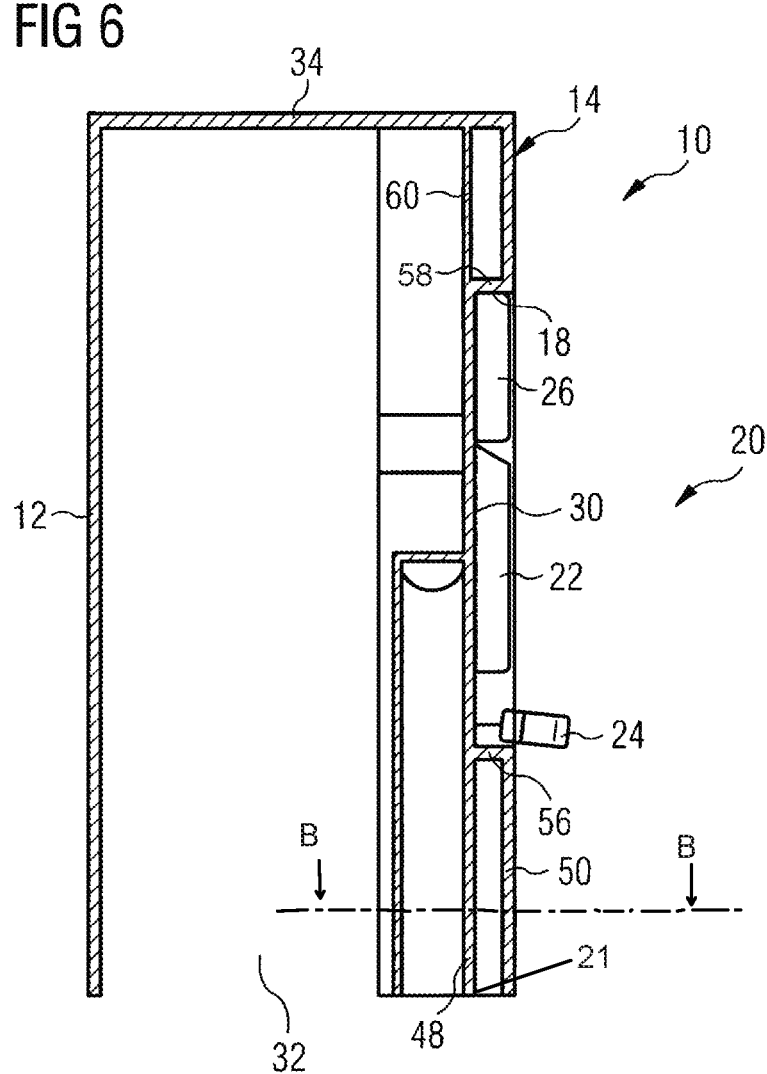
FIG. 6 shows a sectional view of the flight attendant seat arrangement according to FIG. 2, along a line A-A.

A flight attendant seat arrangement 10 which is illustrated in FIGS. 1 to 7 comprises a monument 12 which is intended for installation in an aircraft cabin. In the embodiment of a flight attendant seat arrangement 10 illustrated in FIGS. 1 to 7, the monument 12 in question is a toilet module. As an alternative to this, however, the monument 12 may also be a galley, a partition or any other monument. In the condition of the monument 12 when installed in an aircraft cabin, which condition is illustrated in FIGS. 1 and 2, one wall 14 of said monument 12 faces towards a door aisle 16 which connects a main aisle of the passenger cabin (not shown in the drawings) of the aircraft to a door (likewise not shown in the drawings). The wall 14 of the monument 12 consequently directly borders on an area of the aircraft cabin which is used as an evacuation route in an emergency. A first receiving recess 18 is constructed in the wall 14 of the monument 12, i.e., is formed integral with the wall 14 of the monument 12.

The flight attendant seat arrangement 10 also comprises a flight attendant seat 20 which has a backrest element 22, a seat element 24 and also a headrest 26. As emerges most clearly from a comparison of FIGS. 1 and 2 and also of FIGS. 4 and 5, the seat element 24 can be tilted, relative to the backrest element 22, between an inoperative position (see FIGS. 1, 3 and 4) and a usable position (see FIGS. 2, 5 and 6). When the seat element 24 is located in its inoperative position, a seating surface 28 of said seat element 24 faces towards a rear wall 30 of the first receiving recess 18, i.e., the seating surface 28 rests against said rear wall 30 of the first receiving recess 18. When, on the other hand, the seat element 24 is in its usable position, the seating surface 28 of said seat element 24 forms an angle greater than 90° with the rear wall 30 of the first receiving recess 18 (see particularly FIG. 5).

The backrest element 22 and the headrest 26 are each completely received within the first receiving recess 18 constructed in the wall 14 of the monument 12. The backrest element 22 and the headrest 26 are fixedly attached to the rear wall 30 of the first receiving recess 18 such that the backrest element 22 and the headrest 26 extend substantially parallel to the rear wall 30 of the first receiving recess 18 and a portion of the wall 14 of the monument 12 which borders the first receiving recess 18. When it is in its inoperative position, the seat element 24 is also completely received within the first receiving recess 18. In particular, the backrest element 22 is located in a first section 18*a* of the receiving recess 18, whereas the seat element 24 is arranged, when in its inoperative position, within a second section 18*b* of the receiving recess 18, which second section borders on the first section 18*a* in the direction of an end 32 of the monument 12 on a floor side. Finally, the headrest 26 is arranged within a third section 18*c* of the receiving recess 18 which adjoins, in the direction of a ceiling 34 of the monument 12, the first section 18*a* that receives the backrest element 22.

The flight attendant seat 20 is constructed as a stand-up seat, i.e., is designed in such a way that a person can sit on said flight attendant seat 20 in a standing-up position. For this purpose, the receiving recess 18 and also the components of the flight attendant seat 20 are positioned at a suitable height, i.e., the backrest element 22 is positioned in such a way that it is located at approximately the height of the back of a person who is standing up. Similarly, the headrest 26 is positioned in such a way that it is located at approximately the height of the head of a person who is standing up. Finally, the height of the seat element 24 is chosen in such a way that a person who is standing up can be supported by their buttocks on the seating surface 28 of the seat element 24.

Since the flight attendant seat 20 is constructed in the form of a stand-up seat, the seating surface 28 of the seat element 24 is substantially smaller than a seating surface of a seat element belonging to a conventional flight attendant seat which is intended for use by a flight attendant in a sitting position. In particular, the distance D (see FIG. 5) by which the seat element 24 protrudes from the receiving recess 18 in its usable position is very small and merely amounts, for example, to about 120 to 125 mm.

Also constructed in the wall 14 of the monument 12 is a second receiving recess 36. Said second receiving recess 36 is dimensioned in such a way that there is space within it for items of emergency equipment, such as a flashlight 38, a first aid pack 40, a fire-extinguisher 42 and also an oxygen bottle 44 for the crew. In addition, the second receiving recess 36 is intended for receiving equipment 46 for demonstration purposes, which may comprise, for example, an oxygen mask and also a seat belt. The second receiving recess 36 is located in a manner adjacent to the flight attendant seat 20, so that the items received in said second receiving recess 36 are quickly and easily accessible, if necessary, to a flight attendant located on the flight attendant seat 20.

Figure 7:
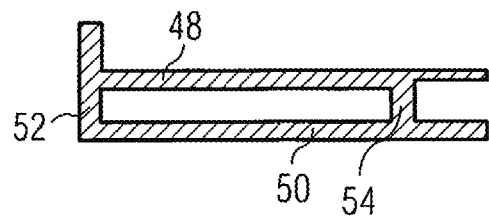
FIG. 7 shows a sectional view of the flight attendant seat arrangement according to FIG. 2 and FIG. 6, along a line B-B.

As emerges most clearly from FIGS. 6 and 7, the wall 14 of the monument 12 is of double-walled design and comprises a support wall 48 which forms the rear wall 30 of the first receiving recess 18 and also extends from said first receiving recess 18, across the width of said first receiving recess 18, as far as the end 21 of the monument 12 on a floor side. The area occupied by the support wall 48 is represented in shaded form in FIG. 3. The backrest element 22, the seat element 24 and the headrest 26 of the flight attendant seat 20 are fastened to the support wall 48. The fastening of the backrest element 22, the seat element 24 and the headrest 26 takes place in the area of that rear wall 30 of the receiving recess 18 which is formed by a section of the support wall 48.

The support wall 48 is dimensioned and designed in such a way that it is capable of dissipating a predetermined maximum force which may be introduced into the flight attendant seat 20 in an emergency and which occurs, for example, if said flight attendant seat 20 is exposed to an acceleration of 9 G or 16 G. As a result, the flight attendant seat 20 may be designed without a separate framework. The dissipation of force from the support wall 48 takes place via an attachment of said support wall 48, in the area of its end on a floor side, to a floor of the aircraft cabin, in particular to a load-bearing structural element of said aircraft cabin floor.

The wall 14 of the monument 12 also comprises an outer wall 50 which is oriented substantially parallel to the support wall 48 and extends over the entire area of said wall 14, although the first receiving recess 18 and also the second receiving recess 36 are left cut out. The wall 14 of the monument 12 also comprises a first side wall 52 which extends substantially perpendicularly to the support wall 48 and the outer wall 50, between said support wall 48 and said outer wall, and defines a first lateral boundary of the first receiving recess 18 (see particularly FIG. 7). There is also provided a second side wall 54 which, like the first side wall 52, extends perpendicularly to the support wall 48 and the outer wall 50 and also substantially parallel to the first side wall 52, between said support wall 48 and said outer wall 50, and defines a second lateral boundary of the first receiving recess 18 (see particularly FIG. 7).

There is also a first connecting wall 56 which extends substantially perpendicularly to the support wall 48, the outer wall 50, the first side wall 52 and the second side wall 54, between said support wall 48 and said outer wall 50, and defines a boundary of the first receiving recess 18 on a floor side (see particularly FIG. 6). In addition, there is a second connecting wall 58 which extends substantially perpendicularly to the support wall 48, the outer wall 50, the first side wall 52 and the second side wall 54 and also substantially parallel to the first connecting wall 56, between said support wall 48 and said outer wall 50, and defines a boundary of the first receiving recess 18 on a ceiling side (see particularly FIG. 6).

Finally, the wall 14 of the monument 12 comprises an inner wall 60. Said inner wall 60 is of thinner and less stable construction than the support wall 48 and extends in a manner coplanar with the support wall 48 and also substantially parallel to the outer wall 50. The inner wall 60 extends, starting from the second connecting wall 58, in the direction of the ceiling 34 of the monument 12 and, starting from the second side wall 54, in a direction that faces away from the first receiving recess 18, from the end 32 of the monument 12 on a floor side as far as the ceiling 34 of said monument 12. In particular, the inner wall 60 extends over that area of the wall 14 which is not represented in shaded form in FIG. 3, i.e., a rear wall 62 of the second receiving recess 36 is formed by a section of said inner wall 60.

The flight attendant seat arrangement 10 also comprises a communication system 64. Said communication system 64 is fastened to the outer wall 50 in a manner adjacent to the first receiving recess 18 and is consequently conveniently accessible to a person located on the flight attendant seat 20.

Cables (not shown in the drawings) which are intended for connecting the communication system 64 to a line network belonging to an aircraft are integrated into the monument 12. For example, it is conceivably possible to lay the cables in a cavity between the inner wall 60 and the outer wall 50.

Finally, the flight attendant seat arrangement 10 comprises a belt arrangement 66. Said belt arrangement 66 is designed as a four-point belt arrangement and is fastened, in the area of the receiving recess 18, to the support wall 48, i.e., to that rear wall 30 of the first receiving recess 18 which is defined by a section of the support wall 48.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A flight attendant seat arrangement comprising:
   a monument suitable for installation in an aircraft cabin having a floor and a ceiling, wherein a first receiving recess is constructed in a wall of said monument; and
   a flight attendant seat which has a backrest element and a seat element, wherein said backrest element is fixedly attached to a rear wall of the first receiving recess such that the backrest element extends substantially parallel to the rear wall of the first receiving recess and a portion of the wall of said monument which borders the first receiving recess,
   wherein the wall of the monument is of a double-walled design comprising:
   a support wall which forms the rear wall of the first receiving recess and extends from said first receiving recess as far as an end of the monument on a floor side, wherein the backrest element and the seat element of the flight attendant seat are fastened to the support wall; and
   an outer wall which is oriented substantially parallel to the support wall
   wherein the seat element is pivotable, relative to the backrest element, between an inoperative position in which a seating surface of said seat element faces towards and is substantially parallel to the rear wall of the first receiving recess, and a usable position in which the seating surface of said seat element forms an angle of at least 80 and no more than 100° with said rear wall of the first receiving recess,
   wherein the backrest element is completely received within a first section of the first receiving recess constructed in the wall of the monument,
   wherein the seat element is completely received within a second section of the first receiving recess constructed in the wall of the monument, at least when said seat element is located in its inoperative position, the second section borders on the first section in a direction of an end of the monument on a floor side,
   wherein the flight attendant seat is constructed as a stand-up seat, and
   wherein the height of the seat element in its inoperative position is chosen in such a way that a person who is standing up can be supported by their buttocks on the seating surface of the seat element when in its usable position.

2. The flight attendant seat arrangement according to claim 1, wherein the angle which the seating surface of the seat element forms with the rear wall of the first receiving recess is greater than 90° when said seat element is located in its usable position.

3. The flight attendant seat arrangement according to claim 1, further comprising a headrest which is at least partially received within a third section of the first receiving recess constructed in the wall of the monument, said third section of the first receiving recess bordering on the first section of the first receiving recess.

4. The flight attendant seat arrangement according to claim 1, wherein the support wall is designed and dimensioned in such a way that the support wall is capable of dissipating a predetermined maximum force which may be introduced into the flight attendant seat in the course of the normal operation of an aircraft during flight.

5. The flight attendant seat arrangement according to claim 1, wherein the support wall is designed and dimensioned in such a way that the support wall is capable of dissipating a predetermined maximum force which may be introduced into the flight attendant seat in the event of a crash.

6. The flight attendant seat arrangement according to claim 1, wherein the wall of the monument further comprises:
   a first side wall which extends substantially perpendicularly to the support wall and the outer wall, between said support wall and said outer wall, and defines a first lateral boundary of the first receiving recess; and
   a second side wall which extends between said support wall and said outer wall substantially perpendicularly to the support wall and the outer wall and substantially parallel to the first side wall, and defines a second lateral boundary of the first receiving recess;
   a first connecting wall which extends between said support wall and said outer wall substantially perpendicularly to the support wall, the outer wall, the first side wall and the second side wall, and defines a lower boundary of the first receiving recess on a floor side; and
   a second connecting wall which extends between said support wall and said outer wall substantially perpendicularly to the support wall, the outer wall, the first side wall and the second side wall and substantially parallel to the first connecting wall, and defines an upper boundary of the first receiving recess on a ceiling side.

7. The flight attendant seat arrangement according to claim 6, wherein the wall of the monument further comprises:
   an inner wall which extends substantially coplanar with the support wall and substantially parallel to the outer wall, starting from the second connecting wall, in the direction of a ceiling of the monument, to said ceiling of the monument and, starting from the second side wall, in a direction that faces away from the first receiving recess, from the end of the monument on the floor side to the ceiling of said monument.

8. The flight attendant seat arrangement according to claim 1, including a second receiving recess constructed in the wall of the monument which is dimensioned in such a way that the second receiving recess is suitable for receiving items of emergency equipment.

9. The flight attendant seat arrangement according to claim 1, further comprising a communication system which is arranged in such a way that the communication system is accessible to a person positioned on the flight attendant seat, and cables integrated into the monument, said cables intended for connecting the communication system to a line network of an aircraft.

10. The flight attendant seat arrangement according to claim 1, further comprising a belt arrangement which is fastened to the support wall.

* * * * *